(12) United States Patent
Zhang et al.

(10) Patent No.: US 9,136,934 B2
(45) Date of Patent: *Sep. 15, 2015

(54) BASE STATION, RELAY, SYSTEM AND METHOD FOR PACKET RE-TRANSMISSION IN A MULTI-HOP NETWORK

(71) Applicant: Microsoft Corporation, Redmond, WA (US)

(72) Inventors: Hang Zhang, Nepean (CA); Shalini Periyalwar, Nepean (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/927,989

(22) Filed: Jun. 26, 2013

(65) Prior Publication Data

US 2013/0286932 A1     Oct. 31, 2013

Related U.S. Application Data

(63) Continuation of application No. 13/470,646, filed on May 14, 2012, now Pat. No. 8,503,351, which is a continuation of application No. 10/894,035, filed on Jul. 20, 2004, now Pat. No. 8,254,300.

(51) Int. Cl.
*H04B 7/155* (2006.01)
*H04W 88/04* (2009.01)
*H04L 1/18* (2006.01)
*H04L 1/00* (2006.01)

(52) U.S. Cl.
CPC ........ *H04B 7/155* (2013.01); *H04L 1/18* (2013.01); *H04L 1/1825* (2013.01); *H04L 1/1864* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 6,590,895 B1 * | 7/2003 | Gupta et al. | 370/394 |
| 6,744,766 B2 | 6/2004 | Alapuranen | |
| 6,754,212 B1 | 6/2004 | Terada et al. | |
| 7,079,489 B2 | 7/2006 | Massie et al. | |
| 7,155,655 B2 | 12/2006 | Cheng | |
| 7,159,035 B2 | 1/2007 | Garcia-Luna-Aceves et al. | |
| 7,218,891 B2 | 5/2007 | Perlyalwar et al. | |
| 7,349,360 B2 | 3/2008 | Gutierrez et al. | |
| 7,577,399 B2 * | 8/2009 | Eichinger et al. | 455/11.1 |
| 7,924,761 B1 * | 4/2011 | Stevens | 370/315 |

(Continued)

OTHER PUBLICATIONS

"Advisory Action", U.S. Appl. No. 10/894,035, (Mar. 31, 2011), 3 pages.

(Continued)

*Primary Examiner* — Candal Elpenord
(74) *Attorney, Agent, or Firm* — Brandon Roper; Judy Yee; Micky Minhas (57) ABSTRACT

Systems and methods for packet re-transmission in multi-hop wireless networks are provided. In some embodiments, RLP packet re-transmission only starts from the hop where L1 ARQ fails. This can result in an increased efficiency of radio resource utilization, such as in implementations where the last hop is more unstable than the remaining hops. In some embodiments, a short RLP recovery delay enables a higher number of re-transmissions of lost RLP packets which, in turn, translates into a higher target physical layer FER (frame error rate) being allowed and/or an increased system capacity. Alternately or additionally, a short RLP recovery delay may reduce the possibility of TCP re-transmission and slow start.

20 Claims, 7 Drawing Sheets

(56) References Cited

U.S. PATENT DOCUMENTS

| | | | |
|---|---|---|---|
| 8,155,013 B2* | 4/2012 | Jeong et al. | 370/248 |
| 8,254,300 B1 | 8/2012 | Zhang et al. | |
| 8,503,351 B1 | 8/2013 | Zhang et al. | |
| 2004/0085943 A1 | 5/2004 | Hsu et al. | |
| 2004/0133640 A1 | 7/2004 | Yeager et al. | |
| 2005/0141593 A1 | 6/2005 | Pasanen et al. | |
| 2005/0163161 A1 | 7/2005 | Wei et al. | |
| 2007/0159985 A1 | 7/2007 | Sunell et al. | |
| 2009/0003378 A1* | 1/2009 | Sachs | 370/466 |
| 2009/0141676 A1* | 6/2009 | Maheshwari et al. | 370/329 |
| 2009/0323770 A1* | 12/2009 | Venkatachalam et al. | 375/133 |
| 2011/0044195 A1* | 2/2011 | Wiemann et al. | 370/252 |

OTHER PUBLICATIONS

"Final Office Action", U.S. Appl. No. 10/894,035, (Jan. 13, 2011), 14 pages.

"Final Office Action", U.S. Appl. No. 10/894,035, (Apr. 21, 2008), 17 pages.

"Final Office Action", U.S. Appl. No. 10/894,035, (Dec. 28, 2009), 15 pages.

"Non-Final Office Action", U.S. Appl. No. 10/894,035, (Apr. 20, 2007), 12 pages.

"Non-Final Office Action", U.S. Appl. No. 10/894,035, (Jun. 26, 2009), 11 pages.

"Non-Final Office Action", U.S. Appl. No. 10/894,035, (Sep. 7, 2010), 13 pages.

"Non-Final Office Action", U.S. Appl. No. 10/894,035, (Sep. 9, 2011), 9 pages.

"Non-Final Office Action", U.S. Appl. No. 10/894,035, (Nov. 2, 2007), 16 pages.

"Non-Final Office Action", U.S. Appl. No. 13/470,646, (Sep. 6, 2012), 15 pages.

"Notice of Allowance", U.S. Appl. No. 10/894,035, (Feb. 7, 2012), 8 pages.

"Notice of Allowance", U.S. Appl. No. 13/470,646, (Apr. 8, 2013), 7 pages.

* cited by examiner

BASE STATION, RELAY, SYSTEM AND METHOD FOR PACKET RE-TRANSMISSION IN A MULTI-HOP NETWORK

RELATED APPLICATIONS

This application is a continuation of U.S. application Ser. No. 13/470,646, filed May 14, 2012, which is a continuation of U.S. patent application Ser. No. 10/894,035, filed Jul. 20, 2004, the disclosures of which are incorporated by reference herein in their entirety.

BACKGROUND

In conventional cellular wireless access networks, a cell is covered by a BTS (base station transceiver) and all mobile terminals communicate with the BTS directly. With the addition of relays, a multi-hop network, including the BTS, relay nodes and mobile terminals, is set up. With relay nodes involved, the coverage of a wireless access network is improved. In such a wireless access network, there may be multiple routes for communicating between a terminal and the network. For example, a terminal can communicate directly with the BTS or indirectly via one or more relay nodes.

Figure 1A:
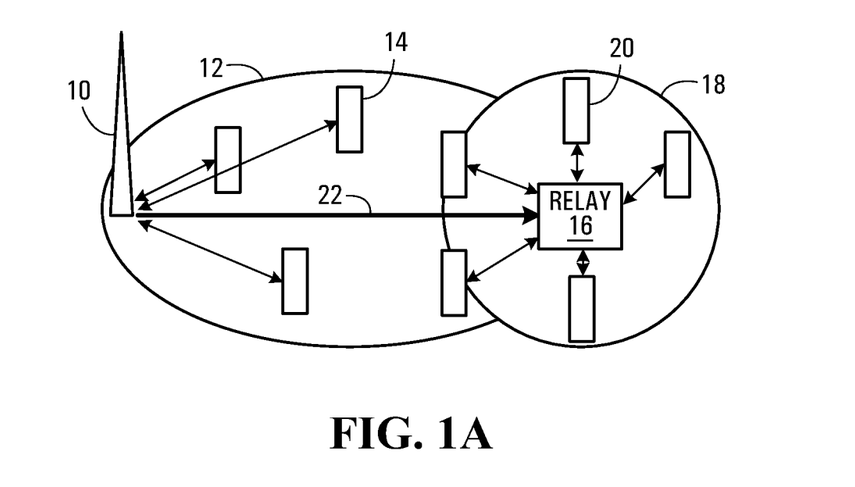
FIG. 1A is a schematic of an example of a two hop network.

An example of a two-hop scenario is shown in FIG. 1A. Shown is a base station 10 having a coverage area 12, and a relay 16 having a coverage area 18. There is a link 22 between the base station 10 and the relay 16 which is typically a high capacity and very reliable wireless link. Shown are a number of mobile terminals 14 communicating directly with the BTS 10, and a number of mobile terminals 20 communicating with the relay 16 which relays communications for these mobile terminals to and from the BTS 10.

In such a network, the fixed relay node 16 is added to improve the coverage in the edge of a cell. Since the relay 16 is a fixed node, the channel between the base station 10 and the relay 16 can be a high quality channel implemented using any one of many advanced channel technologies, such as MIMO, which can provide improved capacity. However, the quality of the channel between the relay node 16 and a mobile terminal 20 is typically lower and less stable due to the mobility of the mobile terminals 20 and due to height differences in the location of the relays 16 and the mobile terminals 20. Because of this, it is possible that data will accumulate in the relay 16 after having been transmitted over the reliable channel between the BTS 10 and the relay 16. This requires the relay node 16 to have a significant buffer capacity, particularly in the cases where a long delay bound is allowed and where there are a lot of mobile terminals 20 that are served by the relay 16. While the illustration shows the relay 16 extending the physical coverage of the cell, this may not always be the case. The relay 16 may provide service to an area within coverage area 12 to enhance service in that area for example to improve rate coverage within coverage area 12. In that case, a decision to communicate directly or indirectly via the relay can be made dynamically.

Figure 1B:
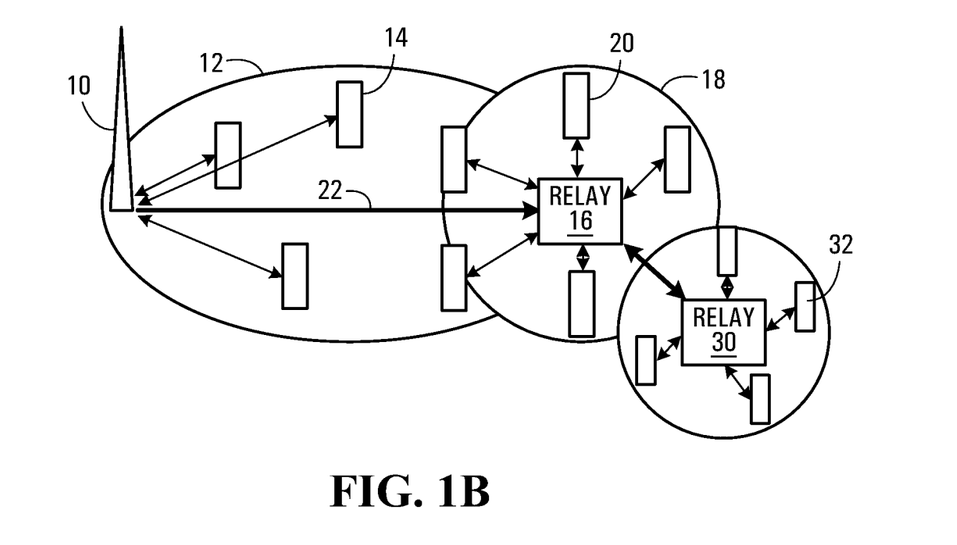
FIG. 1B is a schematic of an example of a three hop network.

FIG. 1B shows an example of a three-hop scenario. In this example, there is an additional relay 30 shown communicating with another wireless terminal 32. There are three wireless hops to get from the BTS 10 through to the wireless terminal 32.

As indicated above, in such networks, the communication between the BTS 10 and the mobile terminal 20,32 may be possible via more than one route. The route can be selected dynamically by a L2 (layer 2) function.

Compared to wire-line networks, a concern on a wireless access network is the unreliability of wireless links. In order to provide comparable quality of wire-line networks, two re-transmission protocols are implemented to improve the reliability of a wireless access network. L1 HARQ (layer 1 hybrid automatic repeat request) is implemented in layer 1 and the Radio Link Protocol (RLP, layer 2 ARQ) is implemented in layer 2. The L1 HARQ is used to improve the quality of each hop individually. Each relay implements the L1 HARQ function. The L2 ARQ is used to improve the quality of a wireless end-to-end connection. Thus the L2 ARQ is implemented in the BTS and terminals but not in the relay nodes. This results in a simple relay node function, which can be beneficial for a low cost wireless access network.

L2 functionality typically includes multiplexing/scheduling functions (implemented by the so-called multiplex sublayer) and flow control functions. If RLP flow control were running on the relay and the base station, two instances of RLP would be required on the wireless terminals to accommodate dynamic route selection. Conventional wireless terminals have only one such instance.

RLP is NACK based and run end-to-end, meaning that the receiver generates a NACK when it receives an out of sequence packet, but otherwise does nothing. L1 HARQ is run on a per-hop basis and is ACK based meaning that for each L1 attempt, the receiver responds to indicate success or failure of the attempt. Typically after some number of failed L1 attempts, the transmitter for that hop moves on to the next packet resulting in an out of sequence packet at the receiver which in turn causes a NACK to be generated.

SUMMARY

Systems and methods for packet re-transmission in multi-hop wireless networks are provided.

Advantageously, in some embodiments RLP packet re-transmission only starts from the hop where L1 ARQ fails. This results in an increased efficiency of radio resource utilization. The benefit increases with a larger number of hops. In particular, the benefit is greatest for implementations where the last hop is more unstable than the remaining hops. This is the case for the cellular downlink where the last hop is between a relay and a mobile terminal, and this hop is typically the most unstable. However, applications are not limited to this particular case.

The improvement in RLP recovery delay can be translated into an improvement in system capacity and per-terminal throughput. A short RLP recovery delay enables the possibility of a higher number of re-transmissions of lost RLP packets. This in turn translates into a higher target physical layer FER (frame error rate) being allowed which in turn translates into an increased system capacity. Furthermore, a short RLP recovery delay may reduce the possibility of TCP re-transmission and slow start.

According to one aspect, some embodiments provide a method of performing re-transmission for a multi-hop communications path, the method comprising: performing a first re-transmission protocol on a per hop basis; performing a second re-transmission protocol on a wireless end-to-end basis; for a particular hop of the multi-hop communications path: upon failure of the first re-transmission protocol for a particular packet for the particular hop, performing at least one additional first re-transmission protocol re-transmission of the particular packet on that hop.

In some embodiments, the at least one additional first re-transmission protocol re-transmission is performed before transmitting a next packet out of sequence on the particular hop.

In some embodiments, a method further comprises giving the at least one additional first re-transmission protocol re-transmission priority.

In some embodiments, the first re-transmission protocol comprises L1 HARQ (layer 1 hybrid automatic repeat request).

In some embodiments, the second re-transmission protocol comprises RLP (radio link protocol).

In some embodiments, performing at least one additional first re-transmission protocol re-transmission of the packet on that hop comprises: re-initiating the first re-transmission protocol for the particular hop after failure of the first re-transmission protocol until success of the first re-transmission protocol, and until a predetermined number of re-initiations of the first re-transmission protocol have been performed in the event of no success of the first re-transmission protocol.

In some embodiments, a method comprises: maintaining at least one parameter allowing a determination of a maximum additional number of first re-transmission protocol re-transmissions on a particular hop to be performed.

In some embodiments, the at least one parameter comprises: a count of a number of second re-transmission protocol re-transmissions to be allowed for each packet which is then used to determine if additional first re-transmission protocol re-transmissions are allowed.

In some embodiments, the at least one parameter comprises: a count of a number of additional first re-transmission protocol re-transmissions to be allowed; further comprising adjusting the count for a given packet for each additional first re-transmission protocol re-transmission of the packet until either the packet is successfully delivered or the count indicates no further first re-transmission protocol re-transmissions are to be performed.

In some embodiments, a method is applied in a multi-hop wireless network, wherein the particular hop comprises a last hop of a communications path through the multi-hop wireless network.

In some embodiments, a method is applied in a multi-hop wireless network, wherein the particular hop comprises a relatively unreliable hop of the multiple hops.

In some embodiments, a method further comprises: a first end of the second re-transmission protocol ignoring messages from a second end of the second re-transmission protocol in respect of packets for which the additional first re-transmission protocol re-transmissions are to take place.

In some embodiments, a method further comprises: performing dynamic route selection to transmit some packets on a single hop directly between a first end of the second re-transmission protocol and a second end of the second re-transmission protocol, and to transmit some packets on multiple hops indirectly between the first end of the second re-transmission protocol and the second end of the second re-transmission protocol; a first end of the second re-transmission protocol ignoring messages from the second end of the second re-transmission protocol in respect of packets that were transmitted indirectly.

In some embodiments, the communications path is between a base station and a mobile device via a relay, the particular hop comprising a wireless link between the relay and the mobile device.

In some embodiments, the second re-transmission protocol is established between the base station and the mobile device, the first re-transmission protocol is established between the relay and the mobile device, the method further comprising: for each packet transmitted from the base station to the relay, including at least one parameter indicating a number of second re-transmission protocol re-transmissions to be allowed for the packet; the relay using the at least one parameter to indicate how many additional first re-transmission protocol re-transmissions are allowed.

According to another broad aspect, some embodiments provide a base station adapted to transmit packets to wireless devices via a relay, the base station comprising: a packet processor adapted to add at least one parameter to each packet sent to the relay, the at least one parameter allowing a determination of how many additional first re-transmission protocol re-transmissions are allowed at the relay after failure of the first re-transmission protocol between the relay and a wireless device for the packet.

In some embodiments, a base station is further adapted to transmit packets directly from the base station to wireless devices, the base station further comprising: a second re-transmission protocol processor adapted to perform an end-to-end re-transmission protocol for packets sent from the base station to wireless devices, the second re-transmission protocol processor being adapted to ignore particular second re-transmission protocol messages received from wireless devices in respect of packets sent via the relay.

According to another broad aspect, some embodiments provide a relay comprising: a receiver for receiving packets; a transmitter for transmitting the packets on a wireless hop of a multi-hop communications path; the relay being adapted to implement a first re-transmission protocol over the wireless hop; the relay being further adapted to, upon failure of the first re-transmission protocol for a particular packet, perform at least one additional first re-transmission protocol re-transmission of the particular packet on the wireless hop.

In some embodiments, a relay is adapted to perform the at least one additional first re-transmission protocol re-transmission of the particular packet on the wireless hop before transmitting an out of sequence packet on the wireless hop.

In some embodiments, the transmitter is adapted to transmit packets to a plurality of receivers on a respective wireless hop of a respective multi-hop communications path for each receiver; the relay being adapted to give priority to re-transmissions above normal traffic.

In some embodiments, a relay is adapted to extract at least one parameter from each packet and to perform the additional first re-transmission protocol re-transmissions in accordance with the at least one parameter.

BRIEF DESCRIPTION OF THE DRAWINGS

Various embodiments will now be described with reference to the attached drawings in which.

DETAILED DESCRIPTION

Figure 2:
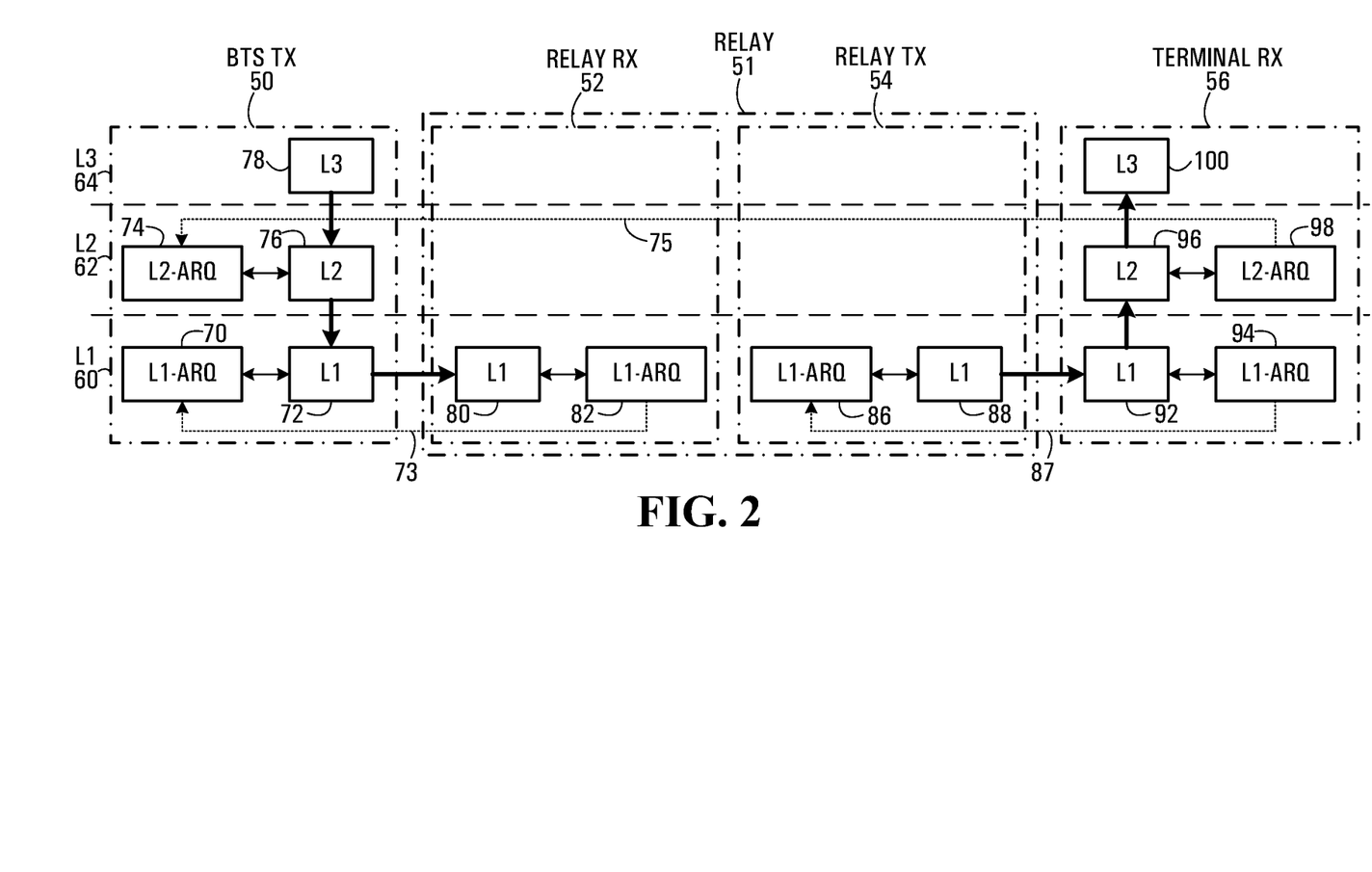
FIG. 2 is a schematic diagram of an L1 and L2 scheme within a network featuring a relay.

FIG. 2 shows an example of a two-hop wireless connection. FIG. 2 will be used to illustrate how L1 ARQ typically HARQ, and L2 ARQ, typically RLP may be implemented in a multi-hop wireless network. Shown is a BTS transmitter 50, a relay 51 having a relay receiver 52 and a relay transmitter 54, and a terminal receiver 56. Each device 50,52,54,56 has a respective L1 function 72,80,88,92 and respective L1 ARQ function 70,82,86,94. These functional entities are responsible for performing ARQ on a per-hop basis, sometimes referred to as L1 ARQ. Thus there is a first L1 ARQ implemented between the BTS transmitter 50 and the relay receiver 52 as indicated at 73. There is a second L1 ARQ implemented between the relay transmitter 54 and the terminal receiver 56 as indicated by 87. The BTS transmitter 50 and the terminal receiver 56 each have respective full L2 implementations 76,96 with L2 ARQ functions 74,98. These functional entities are responsible for end-to-end ARQ, sometimes referred to as layer 2 ARQ, typically RLP between the BTS transmitter 50 and the terminal receiver 56 as indicated at 75. The relay receiver 52 and the relay transmitter 54 are not involved in the L2 ARQ. Rather, the L2 ARQ is performed end-to-end.

Typically, when the relay 51 fails to transmit a packet successfully to terminal receiver 56 after L1 HARQ, the relay will simply discard the packet. Sometime later, the terminal receiver 56 will realize that there is a packet loss, for example by detecting a sequence number gap, and will issue an L2 NACK (negative acknowledgement). The L2 NACK is transmitted from the terminal receiver 56 all the way back to the BTS transmitter 50 and the impacted packet is transmitted again from the BTS transmitter 50 to the relay 51. It can be seen that although the packet is only lost on the last hop, the packet is re-transmitted again starting from the first hop.

The problem becomes more severe with increasing numbers of hops where again typically most of the packet loss will occur on the last hop. If an L1 packet failure occurs in the first hop, this is not a significant problem since the packet needs to be re-transmitted from the start in any case.

Figure 3A:
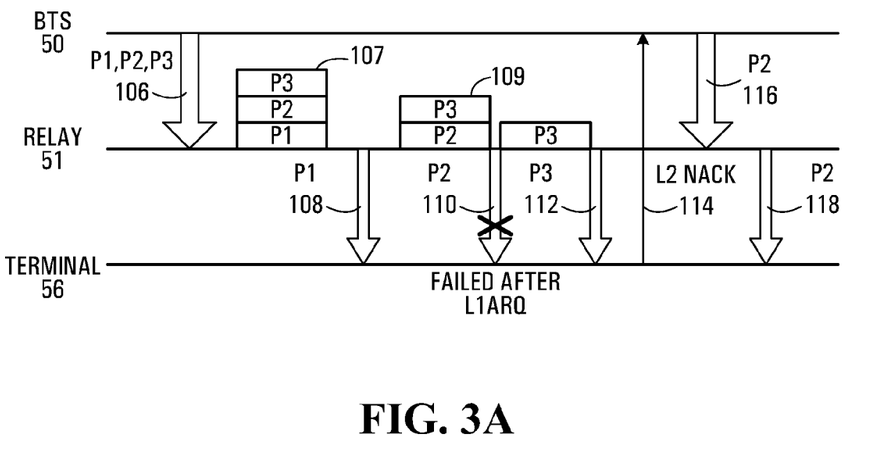
FIGS. 3A and 3B are packet flow diagrams illustrating how unnecessary L2 re-transmissions may occur as a result of transmission failures at the relay.
Figure 3B:
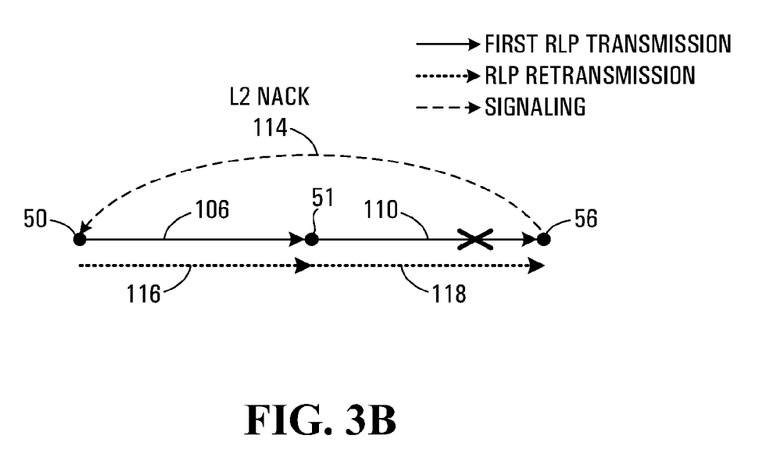

FIGS. 3A and 3B show an illustration of this problem. Shown is a series of transmissions between the BTS 50, the relay 51 and the terminal 56 of FIG. 2. The scenario begins at 106 with the transmission of three packets P1,P2,P3 from the BTS 50 to the relay 51. These are shown being buffered at 107 in the relay 51. At 108, the relay 51 transmits packet P1 to the terminal 56 and the new contents of the buffer are indicated at 109. At 110, the relay 51 attempts to transmit packet P2, but this fails after L1 ARQ. Packet P3 is transmitted at 112, and shortly thereafter, the terminal 56 will detect a gap in the sequence numbers of the packets received and will generate an L2 NACK 114 which is sent right back to the BTS 50. In response to this, the BTS 50 will re-send the packet P2 as indicated at 116 to the relay 51. The relay 51 then sends the packet P2 at 118 to the terminal 56.

Figure 4:
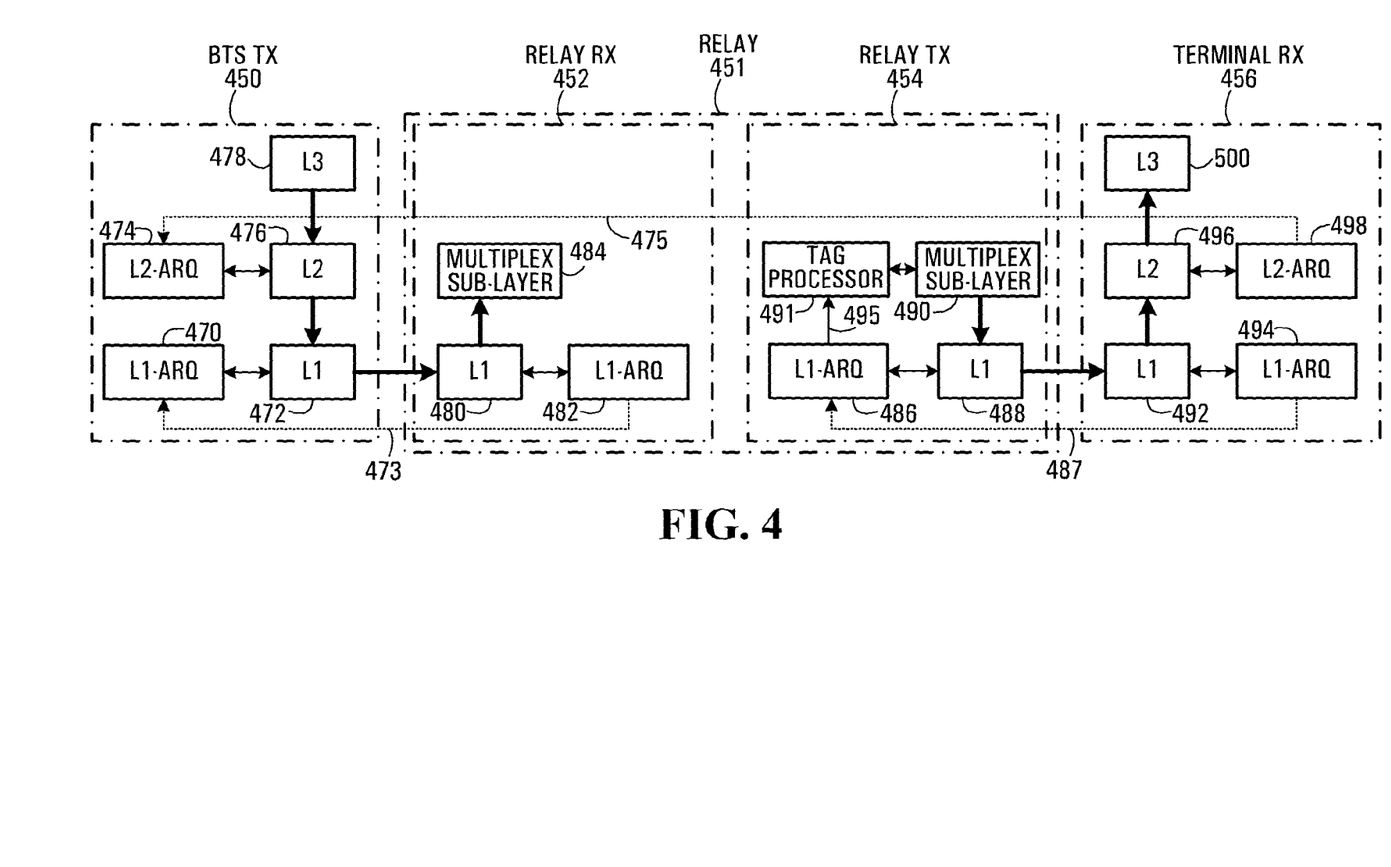
FIG. 4 is a schematic diagram of a relay provided by at least one embodiment associated with a multi-hop network.

Consider FIG. 4, which shows an example of a two hop wireless connection in accordance with one or more embodiments. Shown is a BTS transmitter 450, a relay 451 having a relay receiver 452 and a relay transmitter 454, and a terminal receiver 456. Each device 450,452,454,456 has a respective L1 function 472,480,488,492 and respective L1 ARQ functions 470,482,486,494. These functional entities are responsible for performing L1 ARQ on each wireless hop. Thus there is a first L1 ARQ implemented between the BTS transmitter 450 and the relay receiver 452 as indicated at 473. There is a second L1 ARQ implemented between the relay transmitter 454 and the terminal receiver 456 as indicated by 487. The BTS transmitter 450 and the terminal receiver 456 each have respective full L2 implementations 476,496 with L2-ARQ functions 474,498. These functional entities implement layer 2 ARQ, typically RLP between the BTS transmitter 450 and the terminal receiver 456 as indicated at 475. Some relay implementations may include minimized L2 functions as indicated at 484 for the relay receiver 452 and 490 for the relay transmitter 454. This might include a multiplex sub-layer as in the illustrated example.

Also shown in FIG. 4 is a tag processor 491. This is illustrated to be part of the layer 2 of the protocol stack. However, this is an arbitrary distinction. It is noted for the example implementation of FIG. 4, the method is shown being implemented between the relay 451 and the terminal receiver 456. More generally, it can be implemented on any hop of a multi-hop wireless network, even including the first hop. However, in most implementations, the method does not need to be implemented on the first hop between the transmitter 450 and relay receiver 452 because if an L1 ARQ failure occurs in the first hop, the sender L1 ARQ can directly communicate with the sender L2 ARQ to immediately determine whether the lost packet needs to be re-transmitted. In a scenario with more than two hops, some embodiments implement the new methods on the last hop. This is because typically it is the last hop that has a decreased reliability. However, in implementations in which others of the links making up a multi-hop link were also not reliable, and may also be advantageous to implement the method on those links.

More generally, some embodiments are applicable to perform re-transmission for a multi-hop communications path in which there is a first re-transmission protocol on a per hop basis, and there is a second re-transmission protocol on an end-to-end basis. In the above example, the first re-transmission protocol is L1 HARQ, and the second re-transmission protocol is RLP. However, other re-transmission protocols can alternatively be employed. The second re-transmission protocol has a first end of the protocol and a second end of the protocol. Since this is run end-to-end, any multi-hop wireless network the first end would be a base station, and a second end a mobile terminal.

FIG. 4 shows a detailed block diagram for the BTS transmitter 450, the relay 451 and the terminal receivers 456. This is an example of a functional layout for the purpose of illustration only. It is to be understood that the interconnection between various components may be different, and that there may be fewer or additional components than those shown specifically in FIG. 4. It is also noted that the functionality may be included in a fewer or larger number of functional blocks. Hardware, software and/or firmware can be employed. By "BTS transmitter", it is meant a transmitter and antenna. A single base station may have multiple sectors and as such multiple transmitters and antennas. A base station that is not sectorized will have only a single transmitter. In some cases, the BTS 450 adds a tag to each packet indicating a number of L2 re-transmissions allowed. More generally, in some embodiments the BTS 450 may be considered to have a second re-transmission protocol processor responsible for implementing the end-to-end protocol, and a packet processor responsible for adding at least one parameter to each packet to allow a downstream relay to determine if additional first protocol re-transmissions are allowed.

In some embodiments, the tag processor functional entity maintains a tag for each RLP packet that indicates a delay bound and/or a maximum number of re-trials for the RLP packet. In some embodiments, each re-trial is effectively a new L2 attempt, but initiated by the relay instead of the base station. Each such re-trial may allow for multiple L1 attempts in accordance with the L1 ARQ scheme being used. In the examples that are detailed below, it is assumed that the re-trials are equivalent to L2 re-transmissions. An example of this is shown in Table 1 below.

More generally, in some embodiments, the relay has a packet processor which extracts at least one parameter for each packet received from the BTS, the at least one parameter allowing a determination of additional first re-transmission protocol re-transmissions to be performed. The packet processor can be implemented in any suitable manner, such as hardware, software, firmware, etc. In the illustrated example, the second re-transmission protocol processor is realized with the L2 ARQ 474, and L2 476 and may include part of L1 ARQ 470 and L1 472, depending on where the at least one parameter is added.

Alternatively, since as detailed below in some embodiments L2 NACKs are ignored, each re-trial can be some number of additional L1 attempts not tied to the L2 protocol, or the number of re-trials can be an arbitrary number of L1 re-trials.

TABLE 1

| RLP Packet Sequence Numbers | Maximum Number of Re-Trials | Packet Payload |
| --- | --- | --- |
| 1 | 2 | P1 |
| 2 | 2 | P2 |
| 3 | 2 | P3 |
| 4 | 2 | P4 |
| 5 | 2 | P5 |

In the example above, there are five packets buffered, namely packets having sequence numbers 1, 2, 3, 4 and 5, and the maximum number of re-trials for each RLP packet is indicated at 2.

After detecting a failed transmission of an RLP packet (i.e. L1 ARQ has failed), the relay determines whether or not to perform an additional RLP packet re-transmission based on the information in the tag of the failed packet. A failed re-transmission of an RLP packet is typically detected by receiving an HARQ NACK for the last HARQ re-transmission. More generally, for whatever L1 protocol is being employed, once the L1 protocol fails to deliver the packet over the wireless hop, that transmission has failed. For the failed packet, the tag of the lost packet is consulted, and if the maximum number of re-trials for the packet is still non-zero, then the packet is re-transmitted. At this point, the maximum number of re-trials is adjusted.

In the illustrated example, L1 ARQ 486 in the relay informs the tag processor 491 as indicated at 495 that the failure has occurred. The tag processor 491 decides if an additional L2 re-trial is allowed and if so informs the multiplex sub-layer to re-transmit the packet. In the examples given, it is assumed that L2 packets map one to one to L1 packets. However, it is to be understood the solutions provided herein extend to cases where the relationship is not one to one.

The remaining functional entities of FIG. 4 perform in a conventional manner with one exception. When L1 ARQ fails, the receiving terminal 456 will still generate an L2 NACK that will be transmitted all the way back to the BTS transmitter 450. In at least one embodiment, the BTS transmitter 450 is configured to simply ignore this L2 NACK. A flowchart of example functionality associated with BTS transmitter 450 is given below in FIG. 7. This is only one example implementation of the base station. Furthermore, a flowchart of an example method implemented in the relay 451 is given below in FIG. 6. This is only one example of how the method can be implemented.

Figure 5A:
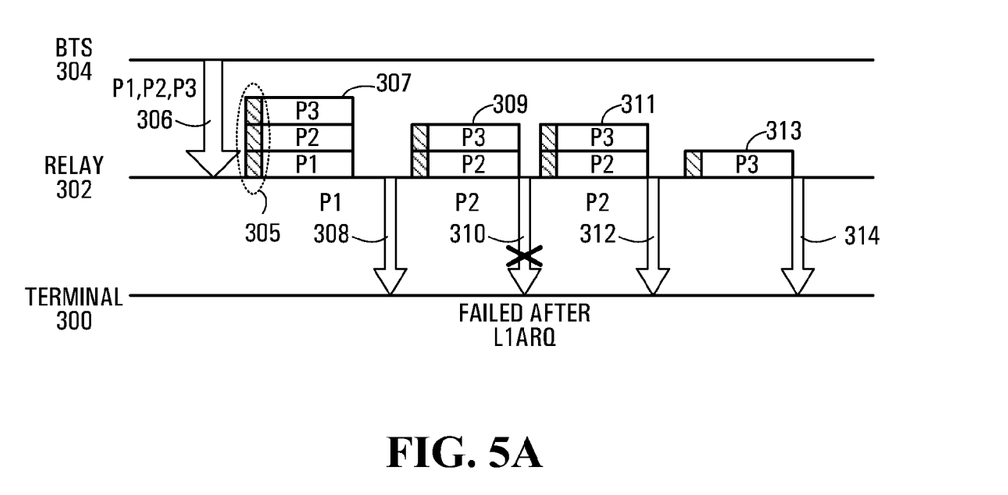
FIGS. 5A and 5B illustrate packet flows that may result using the relay of FIG. 4 so as to avoid unnecessary L2 re-transmissions.
Figure 5B:
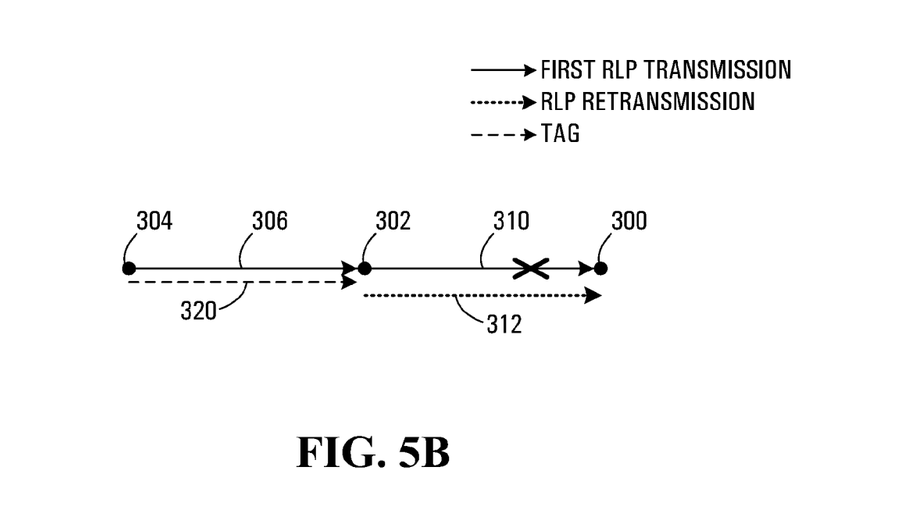

Referring now to FIGS. 5A and 5B, shown is an example packet flow illustrating how the tag processor works. This is again a two-hop example with a terminal 300, relay 302 and BTS 304. At 306, the BTS 304 transmits three packets P1, P2 and P3 and these are shown being buffered at 307 with their respective tags 305. It is noted that the wide arrows in FIG. 5A represent L2 transmission, and each may involve multiple L1 re-transmissions. At 308, the relay 302 transmits P1 to the terminal. The updated contents of the buffer are shown at 309. Here, the fact that P1 is no longer shown in the buffer indicates that successful layer 1 transmission has been achieved. Sometime later, a first attempt to transmit to P2 is made at 310. However, the buffer contents 311 still show P2 present. In this case, the attempt to transmit P2 has failed after L1 ARQ. The tag processor determines if additional L2 re-trials are allowed by consulting the packet's tag. Assuming additional re-trials are allowed, the tag for P2 is then decremented, and a further L2 re-transmission is made for packet P2 at 312. This involves re-initiating L1 ARQ for the packet. This time, the re-transmission is successful, and the buffer contents are shown at 313 to only include P3. The L2 transmission of P3 then occurs at 314. In the illustrated example, the receiver receives all packets in the current sequence so no L2 NACK is generated. If after all of the L2 re-trials fail, an out of sequence packet is sent on the last hop, the receiver will then generate a NACK.

Figure 6:
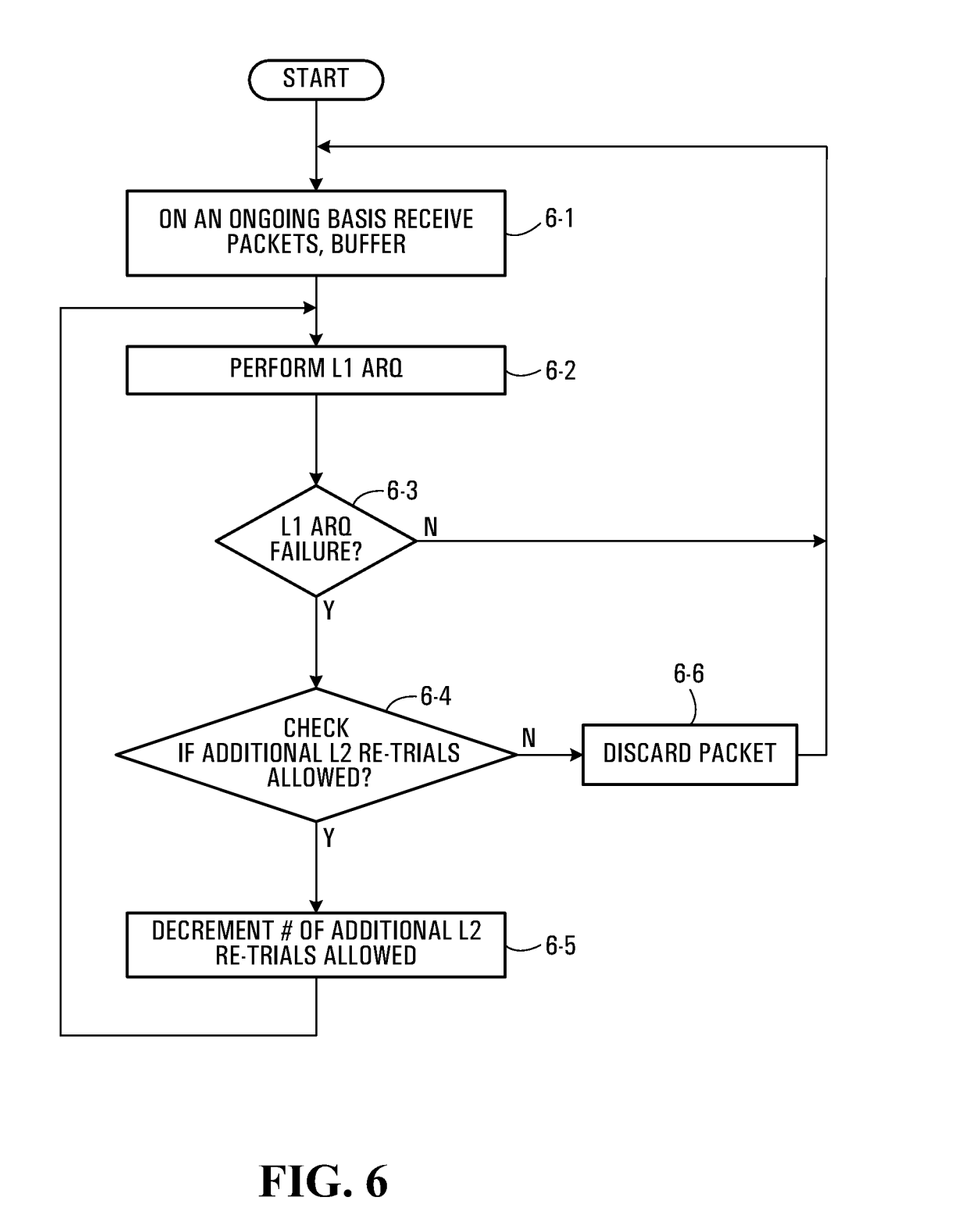
FIG. 6 is a flowchart of an example method implemented within the relay of FIG. 4.

Referring now to FIG. 6, shown is an example method implemented by a relay, in accordance with one or more embodiments. At step 6-1, the relay receives packets and buffers them. This is done on an ongoing basis. At step 6-2, L1 ARQ is performed for the next packet. If no L1 ARQ failure occurs, (no path step 6-3), then the method continues from 6-1. If an L1 ARQ failure occurs, (yes path step 6-3), then a check is made at 6-4 to see if additional L2 re-transmissions are allowed. In the above described example embodiment, this involves checking a tag maintained for each packet to ascertain whether or not additional re-transmissions were allowed. More generally, any appropriate method of making this decision can be employed. If no additional L2 re-transmissions are allowed, (no path 6-4), then the packet is discarded at step 6-6. On the other hand, if additional L2 re-transmissions are allowed, (yes path step 6-4), then at step 6-5 the number of additional L2 re-transmissions allowed is adjusted, and the method then continues at step 6-2 with L1 ARQ being performed for the same packet again. In some instances, for a packet that is being re-transmitted in an additional L2 re-transmission, that packet is moved to the head of the buffer. Alternately or additionally, re-transmission packets are sent before out of sequence packets. In some embodiments, the relay is relaying packets to multiple terminals on a respective wireless hop of a respective multi-hop communications path. At times, a higher priority is given to re-transmission packets than to other packets to other terminals.

At step 6-5, decrementing of the number of additional L2 re-transmissions allowed is shown as an example method of updating this statistic. Other methods may alternatively be employed. For example, a single flag may be employed to indicate that one additional re-transmission is allowed. Once the re-transmission takes place, the flag is cleared. The re-transmission information can be stored in the buffer as a prefix or suffix to the particular packet. Alternatively, the information can be stored separately.

In some embodiments, all packets start with the same number of allowed re-transmissions in which it may not be necessary to include any additional information in packets sent from the BTS. In other embodiments, the number of allowed re-transmissions is a per packet parameter which is sent to the relay by the transmitter as in the above examples. An example of this is shown in FIG. 5B where a tag 320 is shown being transmitted from the BTS 304 to the relay 302 in association with packet P2.

Figure 7:
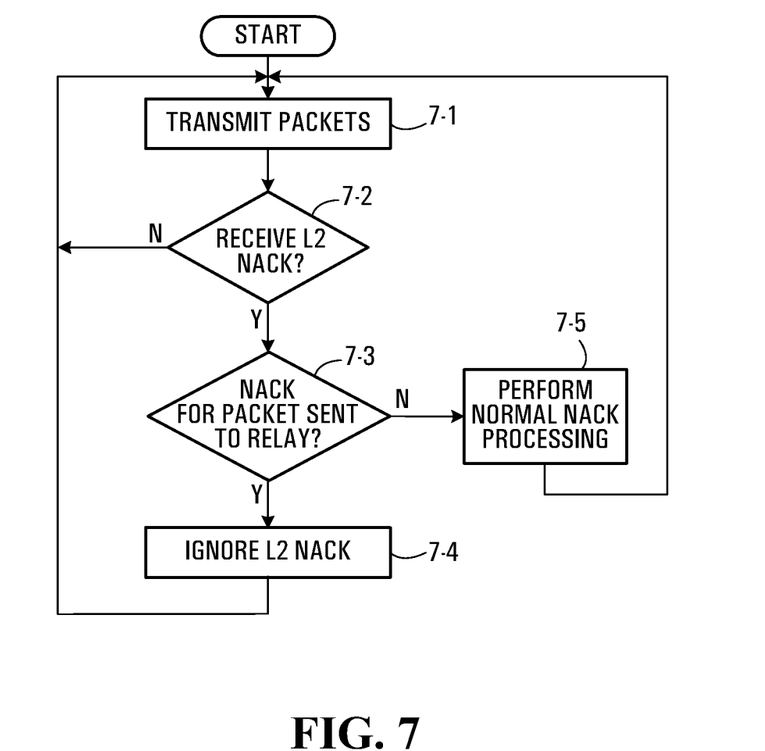
FIG. 7 is a flowchart of NACK processing in the base station in accordance with another embodiment.

Referring now to FIG. 7, shown is a flowchart of functionality implemented in the base station transceiver in accordance with one or more embodiments. At step 7-1, the base station transceiver is shown transmitting packets to the relay or directly to the mobile terminal, bypassing the relay. This is done on an ongoing basis. The base station would in fact be transmitting packets to multiple users, and potentially to multiple relays. At step 7-2, if an L2 NACK is not received, "no" path, the process continues from the step 7-1. At step 7-2, if an L2 NACK is received, "yes" path, then the L2 NACK is ignored at step 7-4 if the NACK is for a packet sent to the relay (yes path, step 7-3). The transmitter should not ignore the L2 NACK unless it can confirm that the packet has been transmitted to the relay. It can do this by verifying that L1 transmission to the relay was successful. By "ignore", it is meant that the decision is not immediately made to initiate L2 packet re-transmission. In some embodiments, all L2 NACKs are ignored in respect of traffic sent via the relay once it is successfully sent to the relay. This is because the L2 re-transmissions are being taken care of by the relay. Once the relay has exhausted its re-trials, this is equivalent to the end-to-end L2 failing. At this point, it is up to the next layer to deal with the problem. For example, TCP (transmission control protocol) might be responsible after failure of L2. The BTS should still pay attention to NACKs in respect of direct, non-relayed traffic, as the BTS is responsible for executing L2 re-trials. If the NACK was not for a packet sent to a relay (no path, step 7-3), then normal NACK processing is conducted at step 7-5. In another embodiment, the transmitter only ignores L2 NACKs satisfying one or more ignore parameters. This might be a number of L2 NACKs to ignore, or a time window for ignoring NACKs of a given packet to name two specific examples.

In the above described embodiments, it is assumed that a number of re-transmissions is maintained in a tag, or a flag is used to indicate a single re-transmission is possible. In another embodiment, a maximum re-transmission time is maintained. In a similar manner to the above described embodiment, this maximum re-transmission time is checked each time L2 re-transmission is to take place, and once the maximum re-transmission time has expired, the relay gives up and discards the packet. More generally, any appropriate parameter(s) may be employed to decide whether or not to make another attempt.

In some embodiments, L1 ARQ is performed using "HARQ channels". In such embodiments, the tag processor may maintain a mapping between the RLP packet and the HARQ channel used for re-transmitting this RLP packet. At the time the relay L1 ARQ receives the last HARQ NACK of an HARQ channel, which indicates a layer 1 HARQ failure in transmitting an RLP packet, the relay layer 1 ARQ indicates the HARQ channel to the tag processor. The tag processor will identify the corresponding RLP packet and further check the parameter in the tag of the RLP packet. If the parameter indicates that one or more re-transmission is still possible, the tag processor will instruct the multiplex sub-layer in the relay to put the packet in the head of the transmission buffer; otherwise the tag processor will instruct the multiplex sub-layer to discard this RLP packet.

Numerous modifications and variations are possible in light of the above teachings. It is therefore to be understood that within the scope of the appended claims, various embodiments may be practiced otherwise than as specifically described herein.

What is claimed is:

1. Processor-executable instructions embodied on a device which, responsive to execution by at least one device processor, are configured to enable the device to:
    perform an end-to-end re-transmission protocol for a multi-hop communications path; and
    perform a per hop re-transmission protocol for each hop of the multi-hop communications path in which, for each hop of the multi-hop communications path, for each packet of a plurality of packets, when a first re-transmission protocol fails for a packet for a particular hop, at least one additional per hop re-transmission protocol re-transmission of that packet is performed on that hop.

2. The processor-executable instructions of claim 1, wherein the at least one per hop re-transmission protocol re-transmission of that packet is performed before transmission of a next packet out of sequence on that particular hop.

3. The processor-executable instructions of claim 1, wherein the processor-executable instructions are further configured to enable the device to give the at least one additional per hop re-transmission protocol re-transmission priority.

4. The processor-executable instructions of claim 1, wherein the per hop re-transmission protocol comprises a layer 1 hybrid automatic repeat request (L1 HARQ).

5. The processor-executable instructions of claim 1, wherein the end-to-end re-transmission protocol comprises radio link protocol (RLP).

6. The processor-executable instructions of claim 1, wherein the processor-executable instructions to enable the device to perform at least one additional per hop re-transmission protocol retransmission for the packet on that hop are further configured to enable the device to:
    reinitiate, based upon a predetermined number of re-initiations, the per hop re-transmission protocol after failure of the per hop re-transmission protocol until:
    the per hop re-transmission protocol succeeds; or
    the predetermined number of re-initiations of the per hop re-transmission protocol is reached without the per hop re-transmission protocol succeeding.

7. The processor-executable instructions of claim 1, wherein the processor-executable instructions are further configured to enable the device to maintain at least one parameter determinative of a maximum additional number of per hop re-transmission protocol retransmissions permitted for each packet on each hop of the multi-hop communications path.

8. The processor-executable instructions of claim 7, wherein the at least one parameter comprises a count of end-to-end re-transmission protocol re-transmissions permitted for each packet on each multi-hop path.

9. The processor-executable instructions of claim 8, the processor-executable instructions further configured to enable the device to determine whether an additional per hop re-transmission protocol re-transmission of a packet is permitted on a particular hop of a multi-hop path using the count of end-to-end re-transmission protocol re-transmissions permitted for each packet on the multi-hop path.

10. The processor-executable instructions of claim 7, wherein:

the at least one parameter comprises a count of additional per hop re-transmission protocol re-transmissions permitted for each packet on each hop of the multi-hop communications path; and the processor-executable instructions are further configured to enable the device to adjust the count for a given packet for each additional per hop re-transmission protocol re-transmission until either the packet is successfully delivered or the count indicates that no further per hop retransmission protocol retransmissions of that packet are permitted.

11. A system comprising:
at least one processor; and
processor-executable instructions embodied on hardware, wherein the processor executable instructions, responsive to execution by the at least one processor, are configured to enable the system to:
perform an end-to-end re-transmission protocol for a multi-hop communications path; and
perform a per hop re-transmission protocol for each hop of the multi-hop communications path in which, for each hop of the multi-hop communications path, for each packet of a plurality of packets, when a first re-transmission protocol fails for a packet for a particular hop, at least one additional per hop re-transmission protocol re-transmission of that packet is performed on that hop.

12. The system of claim 11, wherein the per hop re-transmission protocol is performed on a last hop of the multi-hop communications path.

13. The system of claim 11, wherein the per hop re-transmission protocol is performed on a relatively unreliable hop of the multi-hop communications path.

14. The system of claim 11, wherein a first end of the end-to-end re-transmission protocol ignores messages from a second end of the end-to-end re-transmission protocol for packets for which additional per hop re-transmission protocol re-transmission is anticipated.

15. The system of claim 11, wherein the per hop re-transmission protocol comprises a layer 1 hybrid automatic repeat request (L1 HARQ).

16. The system of claim 11, wherein the multi-hop communications path is between a base station and a mobile device via at least one relay, the particular hop being a wireless link between a relay of the at least one relay and the mobile device.

17. The system of claim 11, wherein the processor-executable instructions to enable the system to perform at least one additional per hop re-transmission protocol retransmission for the packet on that hop are further configured to enable the system to:
reinitiate, based upon a predetermined number of re-initiations, the per hop re-transmission protocol after failure of the per hop re-transmission protocol until:
the per hop re-transmission protocol succeeds; or
the predetermined number of re-initiations of the per hop re-transmission protocol is reached without the per hop re-transmission protocol succeeding.

18. The system of claim 11, wherein the processor-executable instructions are further configured to enable the system to maintain at least one parameter determinative of a maximum additional number of per hop re-transmission protocol retransmissions permitted for each packet on each hop of the multi-hop communications path.

19. The system of claim 18, wherein the at least one parameter comprises a count of end-to-end re-transmission protocol re-transmissions permitted for each packet on each multi-hop path.

20. The system of claim 19, the processor-executable instructions further configured to enable the system to determine whether an additional per hop re-transmission protocol re-transmission of a packet is permitted on a particular hop of a multi-hop path using the count of end-to-end re-transmission protocol re-transmissions permitted for each packet on the multi-hop path.

* * * * *